Aug. 7, 1934.   F. W. VOGEL   1,969,487
INSOLE
Filed March 25, 1931
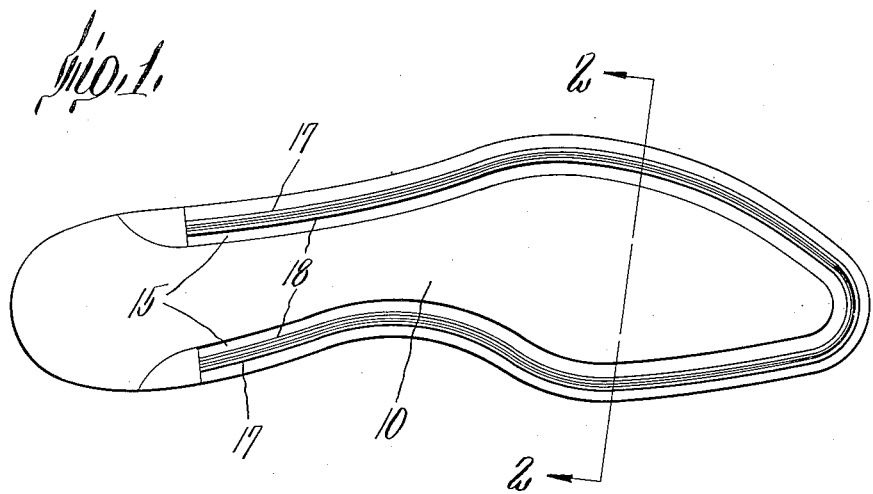
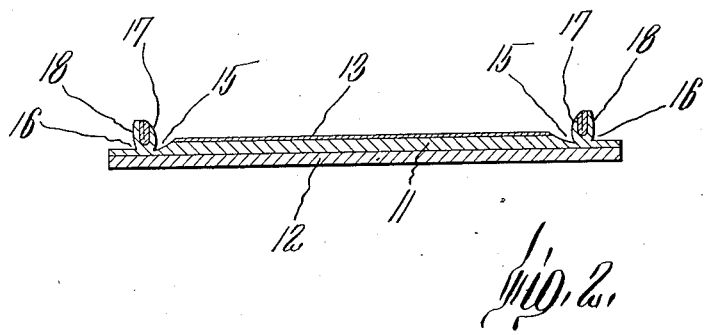
Inventor
Frederick W. Vogel
by Wright, Brown, Quinby & May
Attys Patented Aug. 7, 1934

1,969,487

UNITED STATES PATENT OFFICE 1,969,487

INSOLE

Frederick W. Vogel, Berlin, N. H., assignor to Brown Company, Berlin, N. H., a corporation of Maine Application March 25, 1931, Serial No. 525,087

8 Claims. (Cl. 154—46)

This invention relates to laminated sheet material having layers or plies of different characteristics, and more particularly to an insole for a shoe which may be made out of such sheet material. The insole of a shoe as ordinarily made consists of a blank cut from a sheet of suitable material and thickness, a portion of the margin of the blank being channeled to form a sewing rib to which a welt and the edge of an upper may be sewed. This rib must thus be strong and must be firmly anchored to the insole.

As a substitute for leather which heretofore has usually been employed for insoles, I may use artificial leather made by impregnating sheets of web stock with latex and coagulating the rubber of the latex therein. The web stock preferred for this purpose is a loose fluffy bat of high grade wood pulp fiber which is loosely felted together so as to form a highly porous sheet which has, however, very little mechanical strength. This sheet is impregnated with a dispersion of rubber such as latex, the rubber being thereupon coagulated within the sheet. The resulting product, if properly made, compares favorably with leather in many characteristics such as strength, toughness, ability to absorb water without becoming soggy, flexibility, etc. If a sheet of web stock is simply dipped in a bath of latex and allowed to dry, the distribution of coagulated rubber through the resulting sheet is non-uniform, the concentration being greater near the surfaces of the sheet and considerably less adjacent to the central plane of the sheet. A sheet thus made has a low "ply adhesion", that is, a low resistance to separation of the sheet into two sheets by tearing along its central plane. This characteristic of the sheet may be overcome to a considerable extent by suitable treatment of the latex prior to the immersion of the web stock therein. The non-uniform distribution of rubber throughout an impregnated sheet is apparently caused by the migration of the rubber particles in the latex toward the surfaces of the sheet during the drying of the moisture from the latex. Since the drying occurs chiefly at the faces of the sheet, the moisture from the interior is drawn toward the surfaces of the sheet together with a considerable proportion of the rubber particles. These coagulate near the surfaces and this results in an unequal concentration of rubber in the finished sheet.

The latex bath may, therefore, be treated in such a manner as to reduce or minimize this migration of the rubber particles within the sheet. To this end a substance may be added to the latex bath tending to break down the protective colloids which surround the particles of rubber and thus to promote coagulation before the liquid vehicle of the latex has entirely evaporated. Such substance, in order to be effective, must be added to the latex in sufficient concentration to cause immediate coagulation of the rubber if added alone. In order to prevent such premature coagulation, a protective substance may be mixed into the bath before the coagulating substance is added so as to permit the rubber particles to penetrate thoroughly into the sheet. By way of example, ammonium caseinate may be employed as a protective substance and slaked lime or calcium may be employed as the coagulating agent. The addition to ordinary latex of a solution of ammonium caseinate of about 20% strength, prepared by soaking about 7½% caseinate based on the weight of the latex solids in water and then adding strong ammonia water and heating the mixture, followed by the addition of about 7 to 10% of slaked lime in the form of a thin slurry, results in a treated latex which is capable of readily penetrating a sheet of web stock, but which coagulates readily in the early stages of drying and before any considerable amount of migration of rubber particles within the sheet can take place. A sheet thus made is characterized by toughness, considerable stiffness, a certain amount of flexibility, ability to absorb considerable moisture without becoming soggy, and a considerable degree of ply adhesion. Sheet material thus made is hereinafter referred to for convenience as "lime treated stock".

Artificial leather of the same type may also be made by dipping a sheet of web stock into a bath of ordinary commercial latex, pressing excess latex from the sheet, then coagulating the remaining latex by dipping the sheet in a suitable acid bath such as acetic acid. The acid instantly breaks down the protective colloids around the rubber particles and causes immediate coagulation of the rubber throughout the sheet, so that the acid treated sheet has a considerably greater ply adhesion than a lime treated sheet. The acid treated stock is characterized, however, not only by its high degree of toughness and ply adhesion, but also by a relative great flexibility and a tendency toward tackiness. For this reason it is not as well suited for certain purposes as is the lime treated stock.

According to the present invention I utilize the characteristics of the two different types of stock in the formation of a laminated insole which has the desired characteristics of structure. To this end I form a sheet having a central thick ply of acid treated stock, to one face of which is attached a thick ply of lime treated stock, and to the other face of which is attached a thin ply of lime treated stock. These plies may be secured together as by coating the faces of the several plies with latex and then pressing the plies together while the latex dries. Insole blanks cut from a laminated sheet of these materials have certain desirable characteristics which are set forth at greater length in the description of the invention which follows.

On the drawing, Figure 1 is a plan view of an insole which may embody the invention.

Figure 2 is a section on the line 2—2 of Figure 1.

The insole indicated at 10 may be cut from a suitable laminated sheet consisting of a central ply 11 of acid-treated stock to one face of which is secured a thick ply 12 of lime treated stock. To the opposite face of the ply 11, a thin ply 13 of lime treated stock is secured, these plies being firmly attached to each other by any desired means such as by latex used as an adhesive, the latex being applied to the faces of the plies and the plies being pressed together while the latex dries. In making an insole, the blank 10 is channeled as at 15 and 16, a lip 17 being turned up from the channel 15 while a lip 18 is turned up from the channel 16. These lips may be pressed together to form a sewing rib, as indicated in Figure 2. The welt and upper of the shoe are secured to this rib by stitches which pass through the base of the rib from the channel 15 to the channel 16. It is evident that the rib must be firmly anchored at its base; otherwise the pull of the upper thereon is liable to tear it loose. As the base of the rib is approximately coincident with the central plane of the ply 11, it is highly important that this ply have as high a ply adhesion as possible. Hence, for the ply 11 I preferably employ acid-treated stock, since this stock is characterized by a high ply adhesion. In order to provide desirable stiffness for the insole as a whole, I attach to a face of the ply 11 a layer of lime treated stock 12. This not only stiffens the insole, but also covers one of the tacky surfaces of the layer 11. A thin layer 13 of lime treated stock is preferably applied to the opposite face of the ply 11 to cover its other tacky surface.

I claim:

1. A laminated sheet of artificial leather comprising a central ply of felted fibers impregnated with acid-coagulated rubber, and facing plies of felted fibers impregnated with rubber coagulated from lime-treated latex.

2. A laminated sheet having a central layer of strongly cohesive rubber-impregnated felted fibrous material, and facing layers of stiffer rubber-impregnated fibrous material.

3. A laminated sheet, having a central layer of strongly cohesive rubber-impregnated felted fibrous material, and facing plies of stiffer rubber-impregnated fibrous material, one of said facing layers being substantially thinner than said central layer.

4. A laminated sheet of artificial leather comprising a central ply of felted fibers impregnated with rubber acid-coagulated therein, and facing plies of stiffer felted fibrous material.

5. A laminated sheet of artificial leather comprising a central ply of felted fibers impregnated with acid-coagulated rubber, and facing plies of felted fibers impregnated with rubber coagulated from a rubber-containing liquid dried in the plies.

6. A laminated sheet of artificial leather comprising a central ply of felted fibers impregnated with acid-coagulated rubber, and facing plies of felted fibers impregnated with rubber coagulated from a rubber-containing liquid dried in the plies, one of said surface plies being substantially thinner than the other said plies.

7. A laminated sheet of artificial leather comprising a central ply of felted fibers impregnated with acid-coagulated rubber, and facing plies of felted fibers impregnated with latex dried in the plies.

8. A laminated sheet of artificial leather comprising a central ply of felted fibers impregnated with acid-coagulated rubber, and facing plies of felted fibers impregnated with latex dried in the plies, one of said surface plies being substantially thinner than the other said plies.

FREDERICK W. VOGEL.